United States Patent
Conway et al.

(10) Patent No.: US 9,867,068 B2
(45) Date of Patent: Jan. 9, 2018

(54) WIRESPEED TCP SESSION OPTIMIZATION FOR NETWORKS HAVING RADIO SEGMENTS

(71) Applicants: Verizon Patent and Licensing Inc., Arlington, VA (US); Cellco Partnership, Basking Ridge, NJ (US)

(72) Inventors: Adrian E. Conway, Weston, MA (US); Michael S. Gorman, Concord, NC (US); Deepak Kakadia, Antioch, CA (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 151 days.

(21) Appl. No.: 14/216,519

(22) Filed: Mar. 17, 2014

(65) Prior Publication Data
US 2014/0198643 A1    Jul. 17, 2014

Related U.S. Application Data

(63) Continuation-in-part of application No. 13/661,884, filed on Oct. 26, 2012, now Pat. No. 8,989,008.

(51) Int. Cl.
| | |
|---|---|
| *H04W 24/08* | (2009.01) |
| *H04W 28/02* | (2009.01) |
| *H04L 12/807* | (2013.01) |
| *H04L 12/893* | (2013.01) |
| *H04L 12/801* | (2013.01) |
| *H04L 12/835* | (2013.01) |
| *H04L 1/18* | (2006.01) |

(52) U.S. Cl.
CPC .......... *H04W 24/08* (2013.01); *H04L 1/1825* (2013.01); *H04L 47/27* (2013.01); *H04W 28/0231* (2013.01); *H04W 28/0268* (2013.01); *H04W 28/0273* (2013.01); *H04L 1/1812* (2013.01); *H04L 47/193* (2013.01); *H04L 47/30* (2013.01); *H04L 47/40* (2013.01)

(58) Field of Classification Search
None
See application file for complete search history.

(56) References Cited

U.S. PATENT DOCUMENTS

| | | | |
|---|---|---|---|
| 2010/0211678 A1* | 8/2010 | McDysan | G06F 11/2028 709/225 |
| 2011/0013567 A1* | 1/2011 | Torsner | H04L 1/1621 370/328 |

(Continued)

*Primary Examiner* — Chi H Pham
*Assistant Examiner* — Raul Rivas

(57) ABSTRACT

TCP sessions passing through a network, such as a wireless network, may be optimized based on conditions corresponding to the radio interface of the wireless network. In one implementation, a method may include monitoring, by a base station, performance parameters relating to a radio access network (RAN); determining, based on the performance parameters, one or more protocol data units (PDUs) to retransmit; determining one or more Transmission Control Protocol (TCP) sessions and packet sequence numbers corresponding to the one or more PDUs; and transmitting, to a network device, an indication to retransmit packets corresponding to the one or more TCP sessions and packet sequence numbers.

20 Claims, 15 Drawing Sheets

(56) References Cited

U.S. PATENT DOCUMENTS

2011/0289234 A1* 11/2011 Speight .................... H04L 1/18
                                                709/236
2013/0208585 A1*  8/2013 Jonsson .................. H04L 47/12
                                                370/229
2014/0226476 A1*  8/2014 Bertze .................... H04L 47/30
                                                370/230.1

* cited by examiner

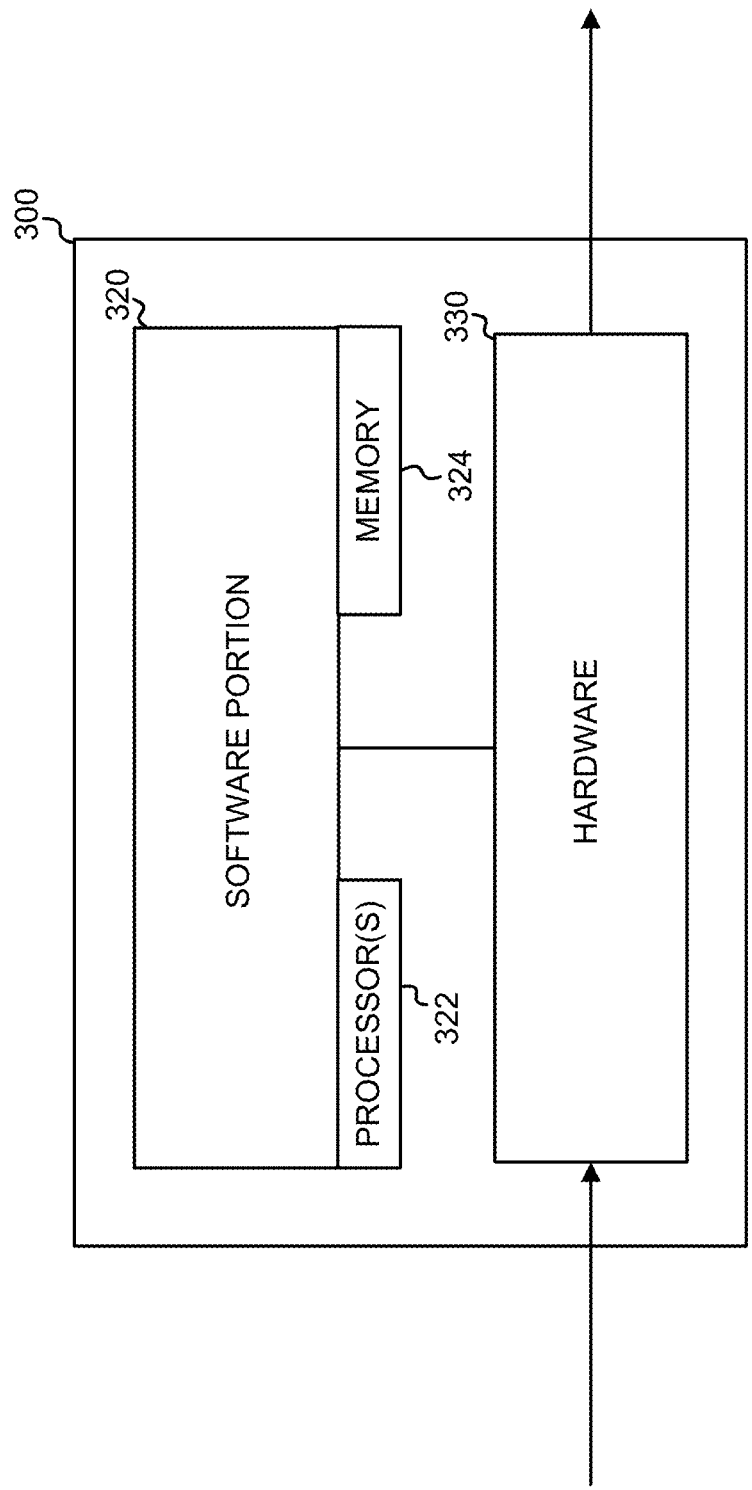

WIRESPEED TCP SESSION OPTIMIZATION FOR NETWORKS HAVING RADIO SEGMENTS

CROSS-REFERENCE TO RELATED APPLICATIONS

This application claims priority from and is a continuation-in-part (CIP) of U.S. patent application Ser. No. 13/661,884, filed Oct. 26, 2012, entitled "WIRESPEED TCP PACKET WINDOW FIELD MODIFICATION FOR NETWORKS HAVING RADIO SEGMENTS."

BACKGROUND

Transmission Control Protocol (TCP) is a commonly used protocol, in the Internet Protocol (IP) suite, that provides data transmission services to application programs. For example, when an application program desires to send data, instead of breaking the data into smaller pieces and issuing a series of IP requests, the application program may issue a single request to a TCP component. The TCP component may, in turn, handle IP-related tasks associated with transmitting the data (e.g., breaking the data into smaller pieces and issuing multiple IP requests to transmit the data).

Due to network congestion, traffic load balancing, or other unpredictable network behavior, IP packets can be lost, duplicated, or delivered out of order. TCP components can detect these problems, request retransmission of lost data, and rearrange out-of-order data. Additionally, TCP components may implement congestion control algorithms to help minimize network congestion.

Existing TCP congestion control mechanisms may be designed for wireline transport, in which a varying amount of traffic is inserted into shared transport "pipes" that have a fixed bandwidth. Existing TCP congestion mechanisms may not work, or may not work effectively or optimally, when: (1) other traffic is inserted in the same wireline transport but does not implement some form of congestion control; or (2) the capacity of the transport changes at a faster rate than at which the TCP congestion control mechanism can detect congestion and take corrective action. Situation (2) may commonly occur in certain non-wireline transport segments, such as radio transport segments.

BRIEF DESCRIPTION OF THE DRAWINGS

FIG. 3 is a diagram of an example implementation of a network device, such as one of the devices in the environment shown in FIGS. 2A and 2B;

DETAILED DESCRIPTION OF PREFERRED EMBODIMENTS

The following detailed description refers to the accompanying drawings. The same reference numbers in different drawings may identify the same or similar elements.

Techniques described herein may provide for a TCP congestion control mechanism that is optimized for transport pipes that include a network segment over a radio access network (RAN). The TCP congestion control mechanism may be performed by a network device, such as a router, firewall, or other network device, that filters packets to potentially modify a TCP window parameter in the packets based on conditions that are present in a RAN segment of the TCP session. The filtering may be performed at wirespeed (e.g., in real-time and without introducing significant latency) and may thus be transparent to the endpoints associated with the TCP session. In one implementation, the TCP congestion control mechanism may be optimized for a Long Term Evolution (LTE) RAN.

Figure 1:
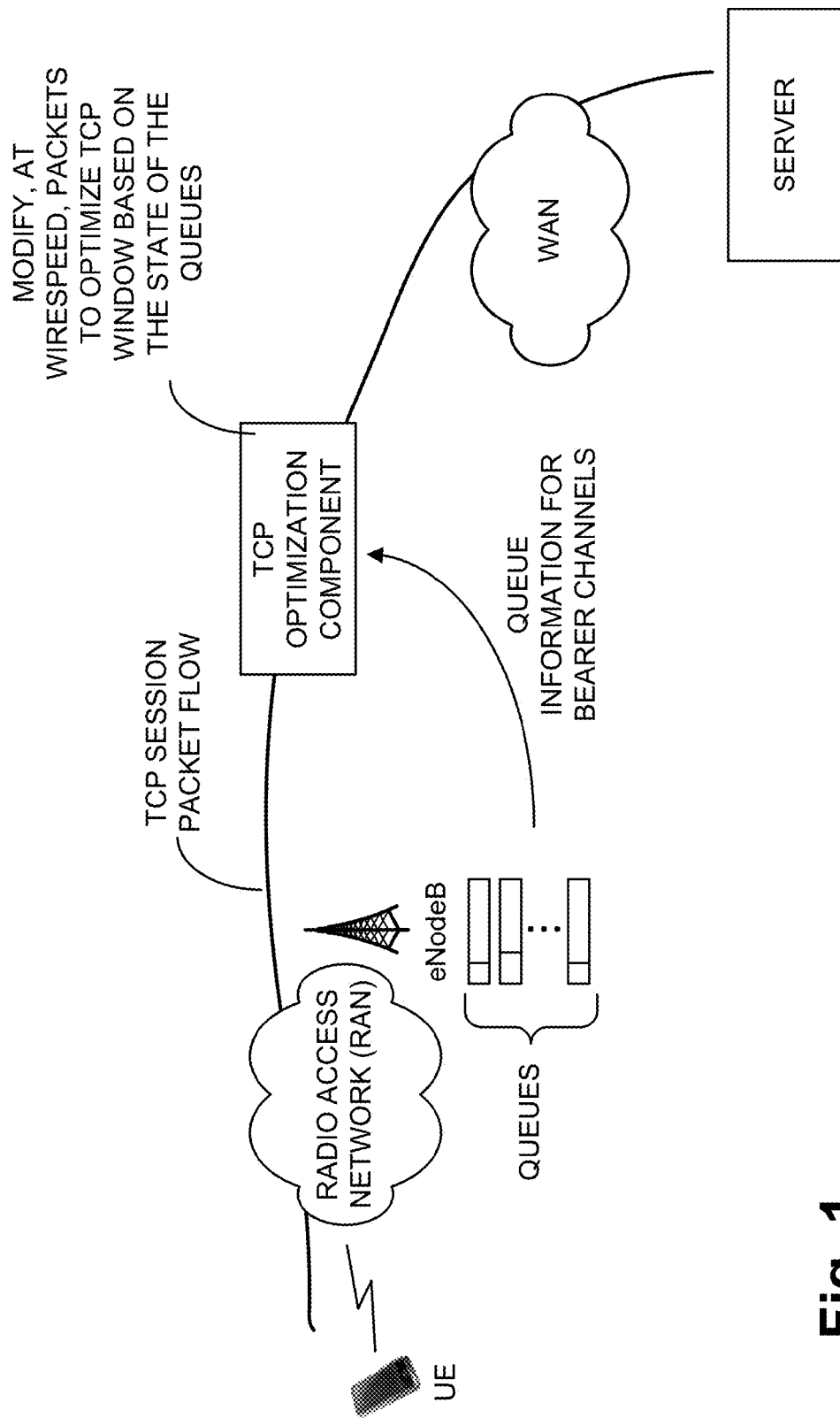
FIG. 1 is a diagram conceptually illustrating an example of an overview of concepts described herein.

FIG. 1 is a diagram conceptually illustrating an example of an overview of concepts described herein. As shown in FIG. 1, user equipment (UE), such as a mobile device, may communicate with a server as part of a TCP session (illustrated by the curved line between the UE and the server). The physical transport layer for the TCP session may span a number of different types of network segments, such as a RAN and a wide area network (WAN) (e.g., the Internet). The radio interface corresponding to the RAN may be implemented via a UE connecting, over a radio connection, to a base station (e.g., an eNodeB in an LTE network). The eNodeB may include queues that are used to buffer traffic before the traffic is transmitted to the RAN and to the UE.

A level of fullness for a particular one of the queues may generally represent a level of congestion in the RAN. For example, when a particular UE has a low-quality radio connection to the eNodeB, the queue, corresponding to that connection, may tend to become full as incoming packets for the particular UE are buffered before transmission over the RAN.

Consistent with aspects described herein, a TCP optimization component may filter packets in the TCP session to optimize the TCP session based on the state of the queues. The TCP optimization component may receive information relating to a state of the queues from the eNodeB. The TCP optimization component may, for example, determine whether to modify a TCP window parameter field in each packet, such as by decreasing the value of the TCP window parameter when a queue is congested The TCP window parameter may be used by the server, in accordance with the TCP protocol, when subsequently controlling the flow of packets transmitted to the UE. By modifying the TCP window parameter field, the TCP optimization component may indirectly control the flow of packets transmitted to the UE. In one implementation, packet filtering performed by the TCP optimization component may be performed at wirespeed. For example, the optimization component may be implemented using a field programmable gate array (FPGA), application specific integrated circuit (ASIC), or other hardware mechanism capable of efficiently and quickly processing packets.

The TCP optimization component, based on the queue state information from the eNodeB, may control the packet flow of a TCP session based on a direct indication of congestion/signal quality in the RAN. Because the RAN network segment is frequently a limiting factor in traffic flow for a TCP session, the traffic flow for the TCP session can be effectively optimized. The optimization may advantageously be performed by a device that is transparent to the operation of the endpoints of the TCP session (e.g., a UE and a server).

Figure 2A:
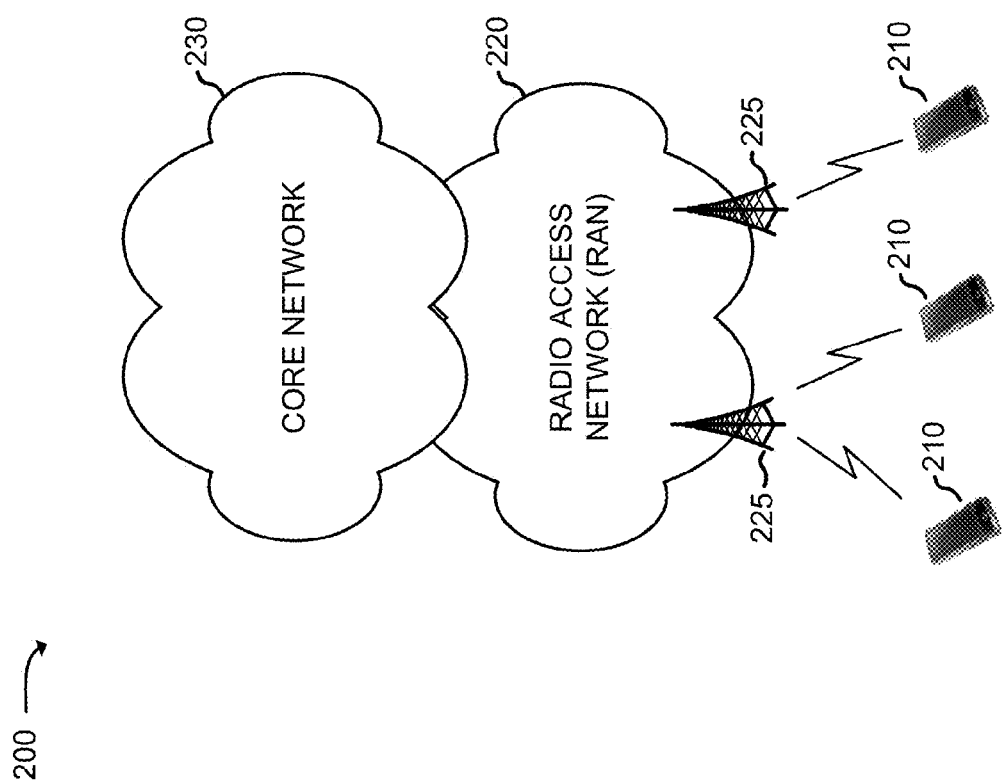
FIG. 2A is a diagram of an example environment in which systems and/or methods described herein may be implemented.

FIG. 2A is a diagram of an example environment 200 in which systems and/or methods described herein may be implemented. As illustrated, environment 200 may include one or more UEs 210, a RAN 220, and a core network 230.

UEs 210 may include portable computing and communication devices, such as a personal digital assistant (PDA), a smart phone, a cellular phone, a laptop computer with connectivity to a cellular wireless network, a tablet computer, etc. UEs 210 may also include non-portable computing devices, such as a desktop computers, consumer or business appliances, set-top devices (STDs), or other devices that have the ability to connect to RAN 120. UEs 210 may connect, through a radio link, to RAN 220. Through the radio link, UEs 210 may obtain data and/or voice services.

RAN 220 may include one or more devices that include radio interfaces to provide wireless connections to UEs 210. In one implementation, RAN 220 may include a radio access network for a cellular network, such as an LTE network. RAN 220, as illustrated, may include one or more base stations, which, in the context of an LTE network, may be referred to as an Evolved Node B (eNodeB) 225. Each eNodeB 225 may provide a radio interface over which the eNodeB may communicate with UEs 210. The radio interfaces provided by RAN 220 may include, for example, orthogonal frequency-division multiplexing (OFDM) and/or single-carrier frequency-division multiple access (SC-FDMA) SC-FDMA based radio interfaces.

Core network 230 may include one or more networks of any type, such as a local area network (LAN), a WAN, and/or a metropolitan area network (MAN). In one implementation, core network 230 may implement an LTE network. In this situation, core network 230 may be implemented using a flat, IP-based network architecture that includes one or more network devices or components that facilitate the providing of network access to UEs 210. Core network 230 may connect to one or more other networks, such as to the Internet, to provide network service to UEs 210.

Figure 2B:
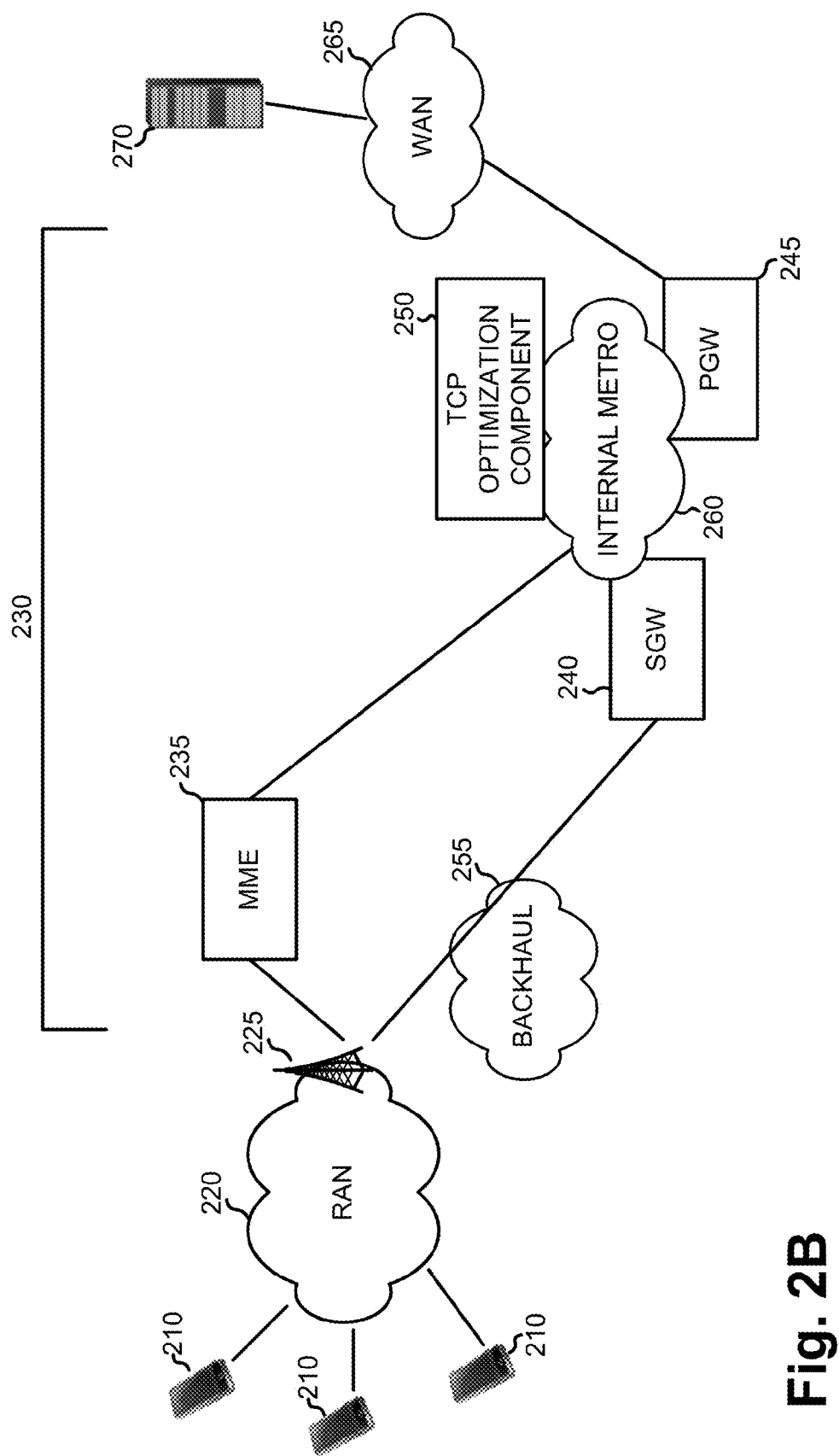
FIG. 2B is a diagram that illustrates a more detailed view of portions of the environment shown in FIG. 2A.

FIG. 2B is a diagram that illustrates a more detailed view of portions of example environment 200. In FIG. 2B, core network 230 may be a core network implemented using LTE technologies. As shown in FIG. 2B, core network 230 may include mobility management entity (MME) 235, serving gateway (SGW) 240, packet data network gateway (PGW) 245, and TCP optimization component 250. MME 235, SGW 240, PGW 245, and TCP optimization component 250 may be connected to one another, and to other devices, through one or more networks that are local to core network 230. For example, backhaul network 255, which may include an Ethernet backhaul network, may be used to connect eNodeB 225 to SGW 240. Similarly, internal metro network 260, which may include a service provider metro network or high speed optical core network, may be used to transport traffic between SGW 240, PGW 245, and TCP optimization component 250.

MME 235 may include one or more computation and communication devices that perform signaling for core network 230. MME 235 may, for example, be responsible for authenticating UEs 210, maintaining location information for UEs 210, and selecting a PGW 245 to service a particular UE 210. SGW 240 may include one or more computation and communication devices that route and forward user data packets. SGW 240 may also act as a mobility anchor during inter-eNodeB 225 handoffs. PGW 245 may include one or more computation and communication devices that provide connectivity from UEs 210 to external packet data networks.

As is further illustrated in FIG. 2B, PGW 245 may be coupled to WAN 265. WAN 265 may be an external packet data network, such as the Internet or another public or private network. Servers, such as server 270, and/or other devices, may be connected to WAN 265.

TCP optimization component 250 may include one or more computation and communication devices that process packet flows relating to TCP sessions, such as a TCP session established between UE 210 and server 270. TCP optimization component 250 may include or be included within, for example, a firewall, router, or other network device. TCP optimization component 250 may receive state information, relating to the congestion state of queues, from eNodeB 225. Based on the state information, and as described in further detail below, TCP optimization component 250 may determine whether to modify the TCP window field of a packet in a TCP session. For example, if the state information indicates that a queue, corresponding to the packet, is congested, the TCP congestion window field may be modified to indicate that a TCP congestion window parameter, used by server 270, should be decreased. In one implementation, TCP optimization component 250 may be implemented to process incoming packets at wireline speed.

Server 270 may include one or more computation and communication devices that provide data and/or computing services to connecting devices, such as to UEs 210. Server 270 may include, for example, a web server, a file server, or another type of server. In one implementation, when communicating with UEs 210, server 270 may use the TCP protocol.

Although TCP optimization component 250 is illustrated in FIG. 2B as a separate component, in some implementations, TCP optimization component 250 may be implemented as part of another network device, such as a functional component within PGW 245.

Although FIGS. 2A and 2B illustrate example components of environment 200, in other implementations, environment 200 may contain fewer components, different components, differently arranged components, or additional components than those depicted in FIG. 2. Alternatively, or additionally, one or more components of environment 200 may perform one or more other tasks described as being performed by one or more other components of environment 200.

FIG. 3 is a diagram of an example implementation of a network device 300, such as one of the devices in environment 200. Network device 300 may represent, for example, MME 235, SGW 240, PGW 245, and/or TCP optimization 250. Network device may 300 may generally operate to analyze and/or filter incoming packets and potentially modify one or more fields of the incoming packets before forwarding the packets towards the destinations of the packets. In order to increase throughput, network device 300 may use dedicated hardware to assist in processing network traffic. As shown in FIG. 3, network device 300 may generally include a software portion 320 and a hardware portion 330.

Software portion 320 may include software designed to control network device 300. In general, software portion 320 may implement the functions of network device 300 that are not time critical. The functions described as being performed by software portion 320 may be implemented through, for example, one or more general purpose processors 322 and one or more computer memories 324. Processors 322 may include processors, microprocessors, or other types of processing logic that may interpret and execute instructions. Computer memories 324 (also referred to as computer-readable media herein) may include random access memories (RAMs), read-only memories (ROMs), and/or other types of dynamic or static storage devices that may store information and instructions for execution by one or more processors 322. In general, software portion 320 may perform certain functions in response to processor(s) 322 executing software instructions contained in a computer-readable medium, such as memory 324. A computer-readable medium may be defined as a non-transitory memory device. A memory device may include space within a single physical memory device or spread across multiple physical memory devices.

Hardware portion 330 may include circuitry for efficiently processing traffic received by network device 300. Hardware portion 330 may include, for example, logic, such as an ASIC, an FPGA, and/or a content-addressable memory (CAM). Hardware portion 330 may receive incoming packets, extract header information for the packets, process the packets based on the extracted header information, and retransmit the packets on the way towards the final destination of the packets.

Although network device 300 is shown as including software portion 320 and hardware portion 330, network device 300 may, in some implementations, be implemented entirely through hardware. Additionally, network device 300 may include additional components, fewer components, different components, or differently arranged components than those illustrated in FIG. 3.

Figure 4:
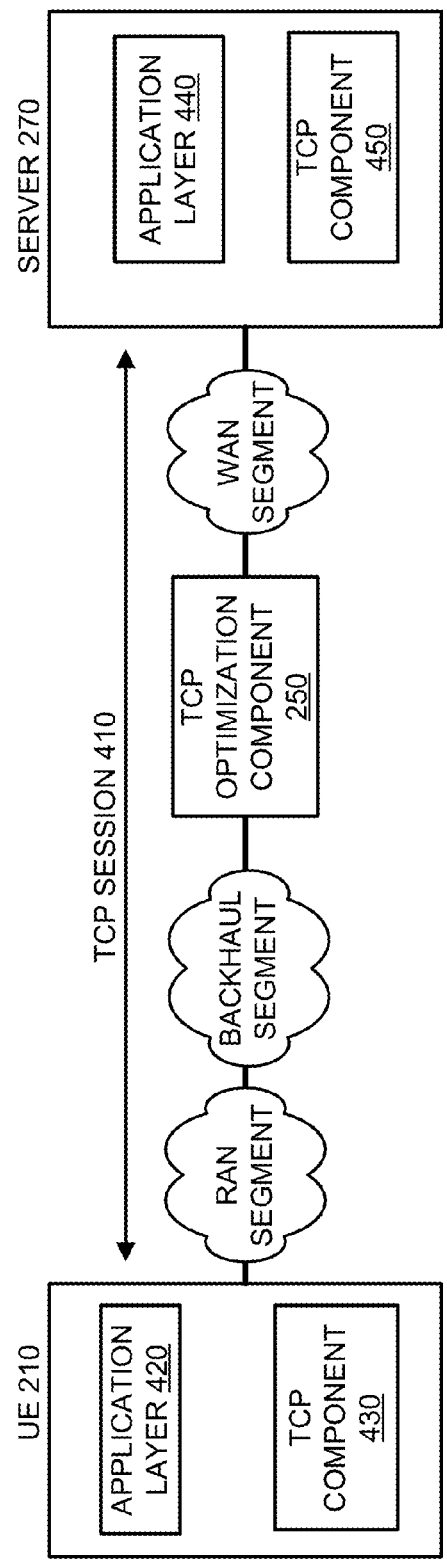
FIG. 4 is a diagram illustrating an example of functional components involved in communications performed using the TCP protocol.

FIG. 4 is a diagram illustrating an example of functional components involved in communications, performed using the TCP protocol, in environment 200. In FIG. 4, UE 210 and server 270 are illustrated as communicating with one another, via a TCP session 410. UE 210 may include application layer 420 and TCP component 430. Similarly, server 270 may include application layer 440 and TCP component 450.

Application layer 420, at UE 210, and application layer 440, at server 270, may represent one or more applications, such as applications that utilize network services. For example, at UE 210, application layer 420 may represent applications such as a web browser, or another program, that uses transport layer network services, such as TCP services. At server 270, application layer 440 may include web server applications or other programs that use transport layer network services, such as TCP services.

TCP component 430 and TCP component 450 may provide TCP services for UE 210 and server 270, respectively. During TCP session 410, TCP component 430 and TCP component 450 may communicate with one another, based on the TCP protocol, to provide reliable, ordered delivery of traffic via TCP session 410. Under the TCP protocol, a parameter, called the TCP window (RWIN), may be used by a sending device to provide an indication of the sending device's ability to receive data. For example, the TCP window may indicate the amount of data a first device (e.g., UE 210) can receive before acknowledging the received data. A second device (e.g., server 270) may use the value of the TPC window when controlling the flow of traffic to the first device. A value for the TCP window may be included in packets sent by the first device to a second device.

The transport channel for TCP session 410 may cover a number of different physical network segments. For example, referring to FIG. 2B, a TCP session between a UE 210 and server 270 may include a segment that traverses the radio interface ("RAN segment"), a segment that traverses backhaul network 255 ("backhaul segment"), and a segment that traverses WAN 265 ("WAN segment"). The various network segments may have different properties relating to reliability and latency. The RAN segment, for example, may be particularly subject to rapid variability in the quality of the radio link. Existing congestion control mechanisms for TCP may perform poorly when dealing with rapid variability of the quality of a network segment, such as a RAN segment.

TCP optimization component 250 may be implemented as a pass-through device with respect to TCP session 410. For example, all packets in a TCP session may be processed by TCP optimization component 250. In one implementation, TCP optimization component 250 may receive information relating to a congestion state of queues in eNodeB 225. Based on the congestion level of a queue corresponding to a particular TCP session, TCP optimization component 250 may modify the packets for the particular TCP session, such as by modifying the value for the TCP window field for the packets. For example, in response to detecting congestion in a queue corresponding to a TCP session between UE 210 and server 270, the TCP window value in a packet, in the TCP session, may be modified to lower the TCP window value. Server 270, in response to receiving the packet with the modified TCP window field, may update a flow control algorithm to reflect the new TCP window field that is associated with UE 210. In such a situation (in which the TCP window is reduced), server 270 may, in some implementations, reduce the amount of data transmitted to UE 210 before receiving an acknowledgement from UE 210.

Figure 5:
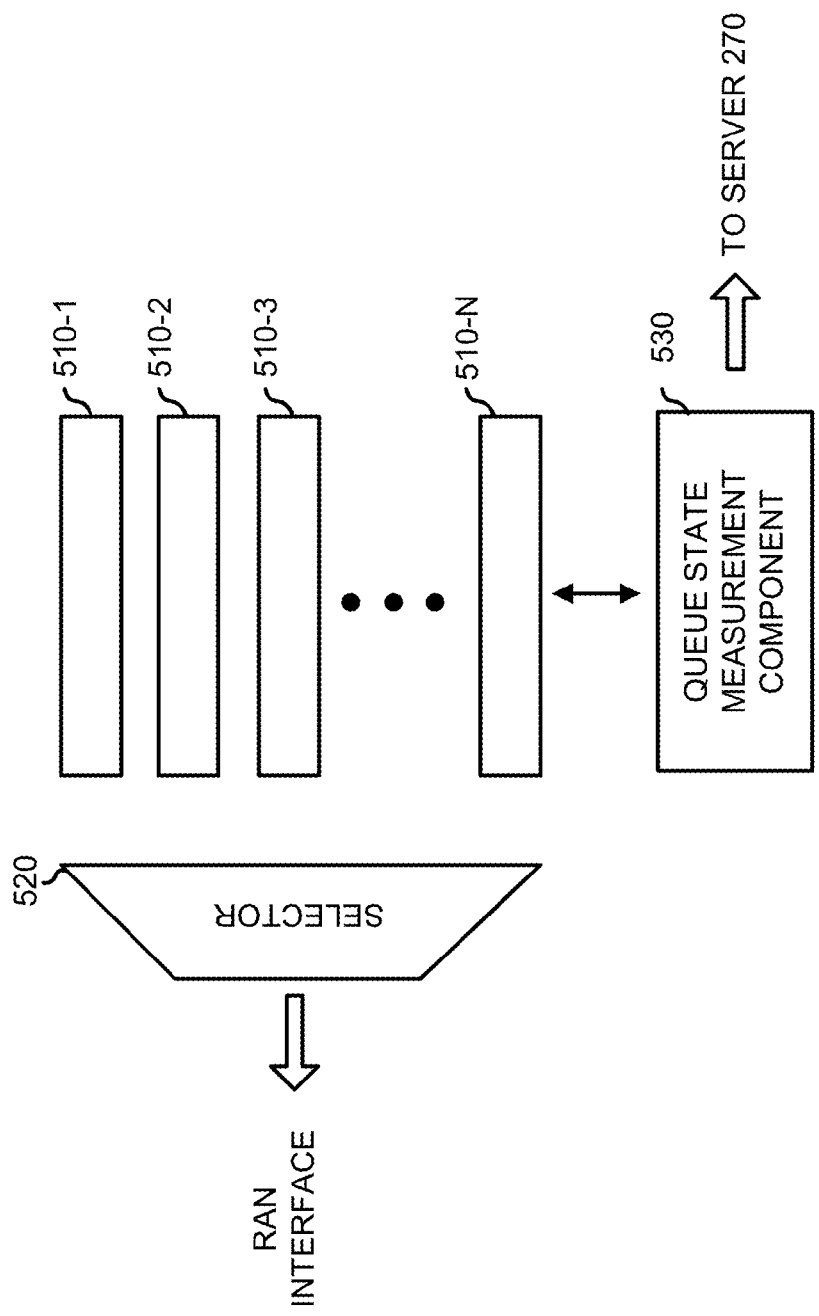
FIG. 5 is a diagram illustrating an example of functional components that may be included in an evolved Node B ("eNodeB")

FIG. 5 is a diagram illustrating an example of functional components that may be included in eNodeB 225. As shown, eNodeB 225 may include a number of queues 510-1 through 510-N (N>=1), selector component 520, and a queue state measurement component 530.

Each queue 510 may include a first-in first-out (FIFO) queue that is used to buffer incoming traffic, such as incoming packetized traffic, before the traffic is transmitted to the radio interface (RAN INTERFACE) of eNodeB 225. In one implementation, queues 510 may be implemented on a per-UE and per-QCI (Quality of Service (QoS) class identifier) basis. In this situation, eNodeB 225 may maintain one queue 510 for each traffic flow, of a particular class of service, for a UE 210. In other implementations, the queues 510 may be assigned differently by eNodeB 225. In some implementations, eNodeB 225 may not store information identifying the TCP session corresponding to a packet. For example, eNodeB 225 may maintain queues 510 on a per-bearer channel basis within core network 230, where a bearer channel may represent a communication channel in core network 230 corresponding to a particular UE and QCI, but may not be able to identify a particular queue with a particular TCP session.

Selector 520 may select traffic, such as packets, from queues 510, for transmission over the RAN interface. A number of selection techniques may be used by selector 520. For example, selector 520 may use a weighted round robin (WRR) technique, a weighted fair queuing (WFQ) technique, a low latency queuing (LLQ) technique, a weighted proportional fairness queuing technique, or other queuing techniques. In one implementation, the selection weightings used by selector 520 may be based on an assigned QCI value corresponding to a queue. For instance, higher priority queues 510 may be assigned higher weightings than lower priority queues 510, and thus the higher priority queues 510 may be selected more often and may therefore correspond to a higher bandwidth RAN interface.

Queue state measurement component 530 may determine state information, relating to a current capacity of each of queues 510. In one implementation, queue state measurement component 530 may output a multi-state value indicating a level of congestion for each queue (e.g., a one byte value indicating 256 possible states of congestion). In other implementations, queue state measurement component 530 may output, for each queue 510, a two-state (binary) value indicating whether a particular queue is congested or not congested. In another possible implementation, queue state measurement component 530 may output a three-state value for each queue indicating, for example, whether the congestion for the queue is below a first threshold, above a second threshold, or in between the first and second threshold.

Although FIG. 5 illustrates an example of functional components that may be included in eNodeB 225, in other implementations, eNodeB 225 may contain fewer components, different components, differently arranged components, or additional components than those depicted in FIG. 5. Alternatively, or additionally, one or more components of eNodeB 225 may perform one or more other tasks described as being performed by one or more other components of eNodeB 225.

Figure 6:
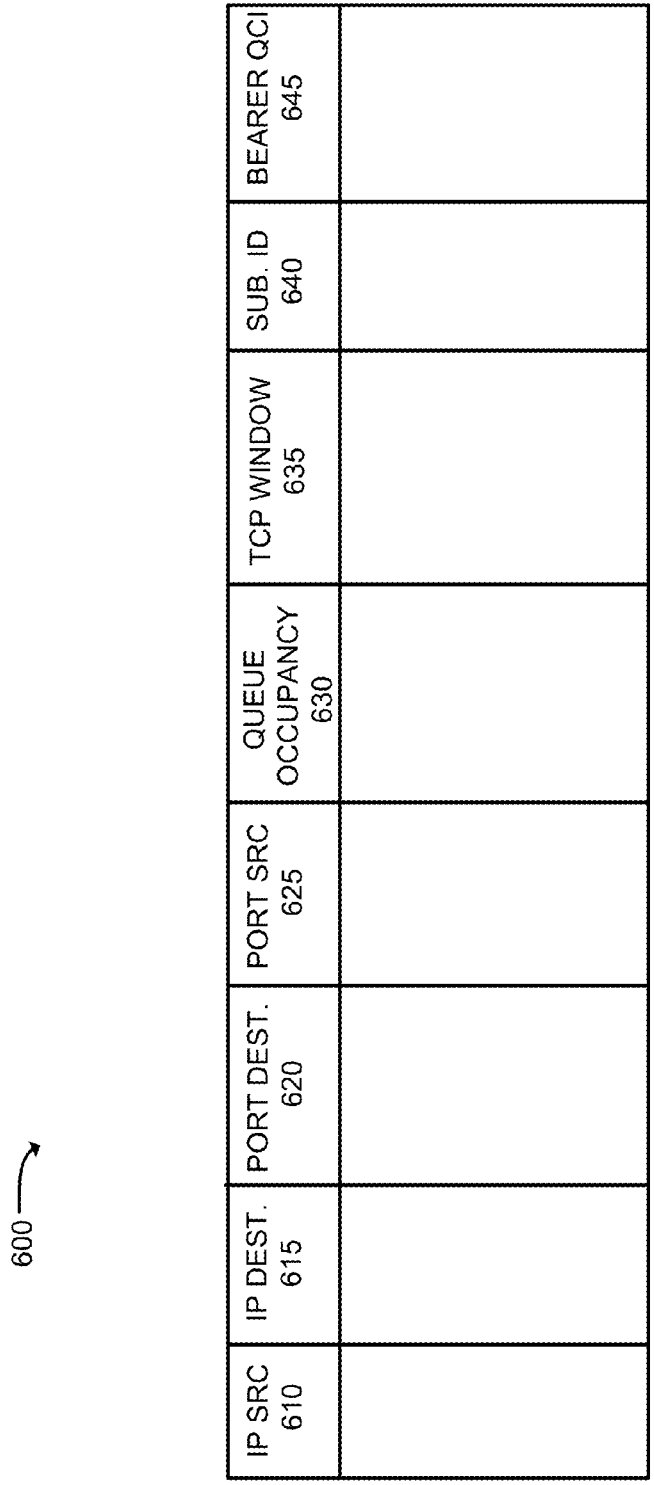
FIG. 6 is a diagram illustrating an example of a data structure that may be maintained by the TCP optimization component shown in FIG. 2B.

FIG. 6 is a diagram illustrating an example of a data structure 600 that may be maintained by TCP optimization component 250. Data structure 600 may be based on information obtained from a number of sources, such as queue congestion state information received from eNodeB 225. In some implementations, data structure 600 may additionally, or alternatively, be based on information obtained from other sources. For example, information correlating bearer channels to TCP sessions may be received from PGW 245 (or from another device in environment 200). The information from PGW 245 may be used to correlate the queue congestion state information to the TCP sessions, such that information identifying a TCP session (e.g., IP source and destination addresses and/or port numbers) may be used to look up the queue congestion state information for the particular TCP session.

As shown in FIG. 6, data structure 600 may include IP source (SRC) field 610, IP destination (DEST) field 615, port destination field 620, port source field 625, queue occupancy field 630, TCP window field 635, subscriber ID field 640, and bearer QCI field 645. In other implementations, data structure 600 may contain additional, fewer, or different fields than those illustrated FIG. 6.

IP source field 610, IP destination field 615, port destination field 620, and port source field 625 may collectively store the IP addressing information for a TCP session. Each entry in data structure 600 may correspond to a particular TCP session. In general, each TPC session may be associated, at each TCP terminating device (e.g., at UE 210 and server 270) with a pair of IP addresses. For example, for a TCP packet transmitted from UE 210 to server 270, the packet may include the IP address of UE 210 as the source IP address, corresponding to IP source field 610, and the IP address of server 270 as the destination IP address, corresponding to IP destination field 615. Packets transmitted from UE 210 may also be associated with a source port value, corresponding to port source field 625, and the destination port value, corresponding to port destination field 620. The values in field 610-625 may be collectively used, by TCP optimization component 250, to look up a TCP session associated with a packet. In some implementations, instead of storing the actual values of fields 610-625 in data structure 600, TCP optimization component 250 may derive a lookup key from fields 610-625, such as a lookup key contained by hashing fields 610-625. TCP optimization component 250 may use the lookup key to quickly identify a particular entry in data structure 600.

Queue occupancy field 630 may include information relating to the congestion state of queues 510. The values for queue occupancy field 630 may, in some implementations, be obtained from eNodeB 225. In one implementation, the queue congestion state information may be proactively transmitted, by eNodeB 125, to TCP optimization component 150, for all or a subset of queues 510. Alternatively or additionally, eNodeB 225 may transmit the queue congestion state information in response to requests from TCP optimization component 250.

TCP window field 635 may include values indicating, for each entry in data structure 600, the TCP window (RWIN) value that is to be used for the corresponding TCP session. The value of TCP window field 635 may be calculated by TCP optimization component 250 based on the value of queue occupancy field 630. For example, one or more threshold values may be set, such as by an administrator, of TCP optimization component 250. When queue occupancy field 630 exceeds the one or more threshold values, TCP optimization component may reduce the corresponding value in TCP window field 635 by a certain amount (e.g., 10%). Other techniques for determining the value of TCP window field 640 for a particular TCP session, based on queue occupancy field 630, may be used. In general, TCP optimization component 250 may determine the value of TCP window field 635 based on the goal to optimize the TCP packet flow based on the level of congestion indicated by queue occupancy field 630.

Subscriber identifier (ID) field 640 and bearer QCI field 645 may include information identifying the subscriber and the QCI value of the bearer channel in core network 230. As previously mentioned, in some implementations, queue congestion state information received from eNodeB 225 may associate the congestion state of queues 510 with information identifying the corresponding bearer channel in core network 230. This information may be stored in data structure 600 in subscriber ID field 640 and bearer QCI field 645.

Figure 7:
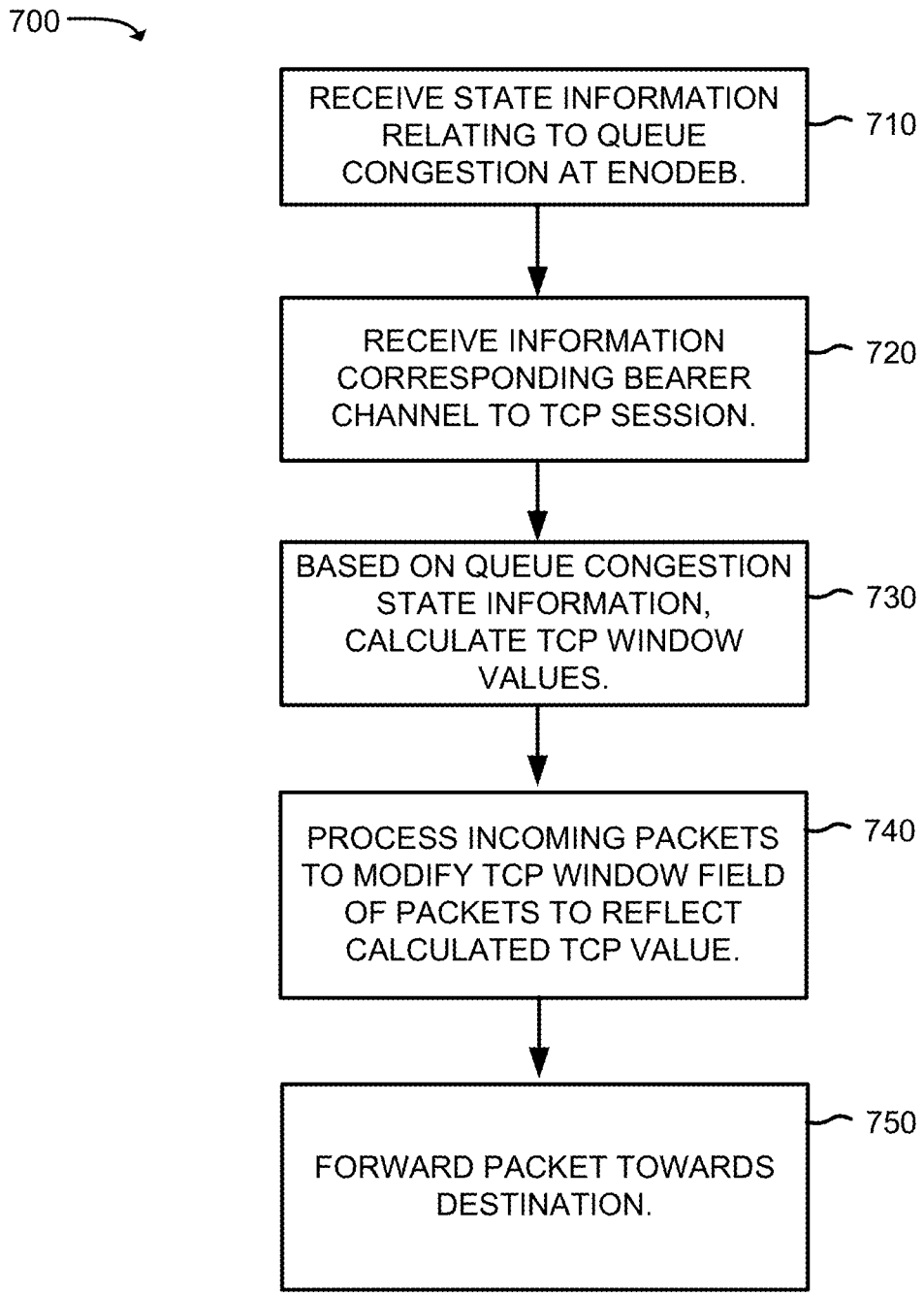
FIG. 7 is a flow chart illustrating an example process for optimizing traffic flow in TCP sessions.

FIG. 7 is a flow chart illustrating an example process 700 for optimizing traffic flow in TCP sessions. In one implementation, process 700 may be performed by TCP optimization component 250.

Process 700 may include receiving state information relating to the congestion state of queues at one or more eNodeBs (block 710). For example, as previously discussed, eNodeB 225 may broadcast or otherwise transmit the congestion state information to TCP optimization component 250. The congestion state information may, for example, describe a congestion state of each of a number of queues 510 that are maintained by eNodeB 225 as part of the transmission of packets, over a radio interface, to UEs 210.

In some situations, eNodeB 225 may not keep track of TCP sessions or may not be configured to correlate TCP sessions to particular queues 510. For example, eNodeB 225 may, for each queue 510, maintain information about the bearer channels, in core network 230, corresponding to queues 510. The information may include, for example, subscriber IDs and QCI levels corresponding to each queue 510. The subscriber ID/QCI values may also be received by TCP optimization component 250.

Process 700 may further include receiving information corresponding bearer channels to TCP sessions (block 720). For example, a network device, such as PGW 245, may have access to both bearer channel information (e.g., subscriber IDs and/or the corresponding QCI levels of the bearer channels) and TCP session information (e.g., source and destination IP address and port value pairs). PGW 245 may transmit this information to TCP optimization component 250. With the information from PGW 245 and eNodeB 225, TCP optimization component 250 may determine a correspondence between the congestion state at queues 510 and TCP sessions, which may allow TCP optimization component to associate incoming packets (associated with TCP sessions) to queues 510.

Process 700 may further include, based on the congestion state information relating to queues 510, calculating TCP window values (block 730). In one implementation, the calculated TCP window values may be values designed to optimize flow control, in a TCP session, in response to a current level of congestion in the corresponding queue 510. Because the level of congestion may directly relate to congestion in the RAN or to other factors that affect bandwidths through the radio interface, flow control in the TCP session may be controlled based on knowledge of the state of the radio interface for a particular TCP session.

As one possible example of the calculation of an updated TCP window value, consider the situation in which the queue state information relating to a particular queue indicates that a particular queue is 10% more congested than a predetermined "acceptable" level of congestion. In response, the TCP window value for the TCP session, corresponding to the queue, may be reduced by a particular amount (e.g., 10%, 20%, or some other amount). Reducing the TCP window value may subsequently cause, when the reduced TCP window value is received by server 270, server 270 to reduce the bandwidth of the data server 270 sends to UE 210 (e.g., by causing server 270 to send a reduced amount of data before receiving an acknowledgement from UE 210). It can be appreciated that numerous other techniques could potentially be used to calculate the updated TCP window values.

In some implementations, the calculation of the TCP window values (block 730) may be performed by software portion 320 of TCP congestion component 250. The calculated window values may be stored in a data structure, such as data structure 600, which may be used to quickly lookup the TCP window value corresponding to a particular TCP session (e.g., as identified by IP address and port information included in a packet).

Process 700 may further include processing incoming packets to modify the TCP window field of the packets to reflect the calculated TCP window values (block 740). For example, TCP optimization component 250 may extract the IP address information from each packet (e.g., the IP source address, the IP destination address, the source port value, and the destination port value) and use the IP address information to look up the corresponding TCP window value from data structure 600. In one implementation, the IP address information may be used to generate a key, such as a key generated via a hash operation on the IP address information, that indexes data structure 600. TCP optimization component 250 may use the looked-up window value to modify the TCP window value in the packet before the packet is transmitted from TCP optimization component 250. In some implementations, block 740 may be performed by hardware portion 330, of TCP optimization component 250, to obtain wirespeed or near-wirespeed operation.

Process 700 may further include forwarding the packets towards the destinations corresponding to the packets (block 740). The forwarded packets may include the packets in which the TCP window value is modified.

Figure 8:
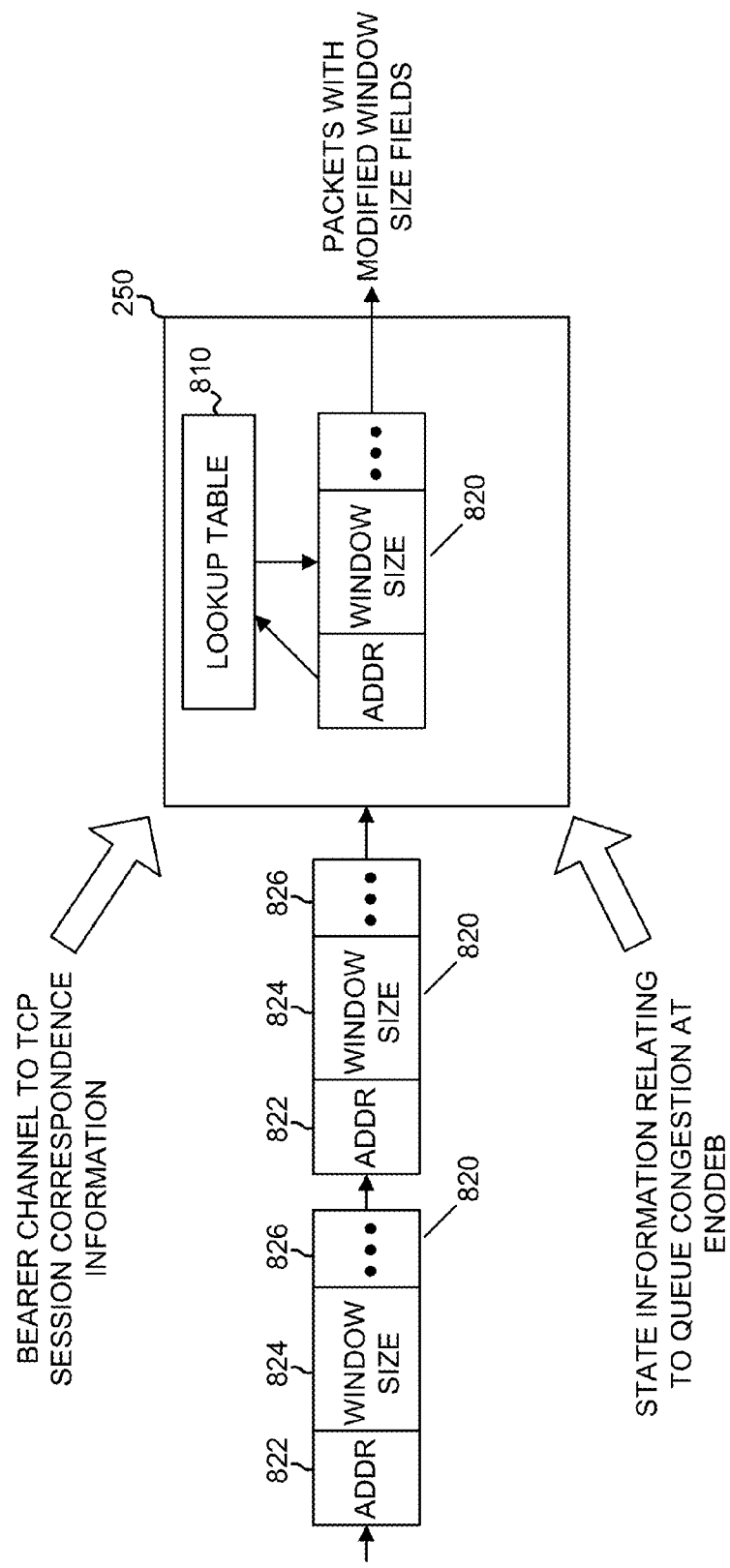
FIG. 8 is a diagram conceptually illustrating operation of one possible implementation of the TCP optimization component shown in FIG. 2B.

FIG. 8 is a diagram conceptually illustrating operation of one possible implementation of TCP optimization component 250.

As illustrated, TCP optimization component 250 may include lookup table 810, which may updated based on (1) state information relating to queue congestion at eNodeB 225, and (2) bearer channel to TCP session correspondence information. The state information relating to queue congestion at eNodeB 225 may be received from eNodeB 225 and the bearer channel to TCP session correspondence information may be received from PGW 245. Based on this information, TCP optimization component 250 may maintain lookup table 810 in which TCP session address information can be used to lookup a TCP window size parameter, where the TCP window size parameter may be adjusted based on congestion in the queue, at eNodeB 225, corresponding to the TCP session.

TCP optimization component 250 may receive and process incoming packets 820. Each packet 820 may include one or more address fields 822 (e.g., a source IP address and port value, and a destination IP address and port value), TCP window size field 824, and additional fields 826. The additional fields 826 may include, for example, additional packet header fields and/or the payload data for the packet.

For each packet 820, TCP optimization component 250 may extract address fields 822 from the packet and use the address fields to look up, via lookup table 810, an updated TCP window size for the packet. In situations in which the updated TCP window size is different than the TCP window size that is included in the incoming packet, TCP optimization component 250 may modify the packet to include the updated TCP window size. Adjusting the TCP window size for the packets in a TCP session that are being sent from UE 210 to server 270 may cause adjustments in the bandwidth of the packet flow, by server 270, in subsequent packets transmitted from server 270 to UE 210.

The address lookup and modification, as performed by TCP optimization component 250, and as shown in the example implementation of FIG. 8, may be implemented in hardware, such as through the use of an ASIC, FPGA, or network processor. Advantageously, TCP optimization component 250 may execute at wirespeed (or near wirespeed) and thus introduce relatively little latency into the TCP session. Additionally, due to the hardware implementation, the operation of TCP optimization component 250 may be scaled relatively easily. In contrast, other approaches to optimize TCP sessions that involve terminating TCP sockets at an intermediate device, may be associated with latency and scaling issues.

A TCP congestion control mechanism was described above in which TCP window fields, associated with packets being transmitted as part of a TCP session, may be modified at wirespeed (i.e., in real-time or near real time). The TCP window field may be modified based on state information, such as a congestion level of queues in an eNodeB, to optimize the TCP session based on the state of the radio interface of the eNodeB.

As will be described with respect to FIGS. 9-14, in additional embodiments, additional techniques may be used to optimize TCP sessions passing through a network such as a wireless cellular network (e.g., a LTE-based network). As with the TCP session optimization techniques described previously with respect to FIGS. 1-8, the additional embodiments described below may be performed transparently with respect to the operation of the end devices (i.e., with respect to UE 210 and server 270 at which the TCP session may terminate).

Figure 9:
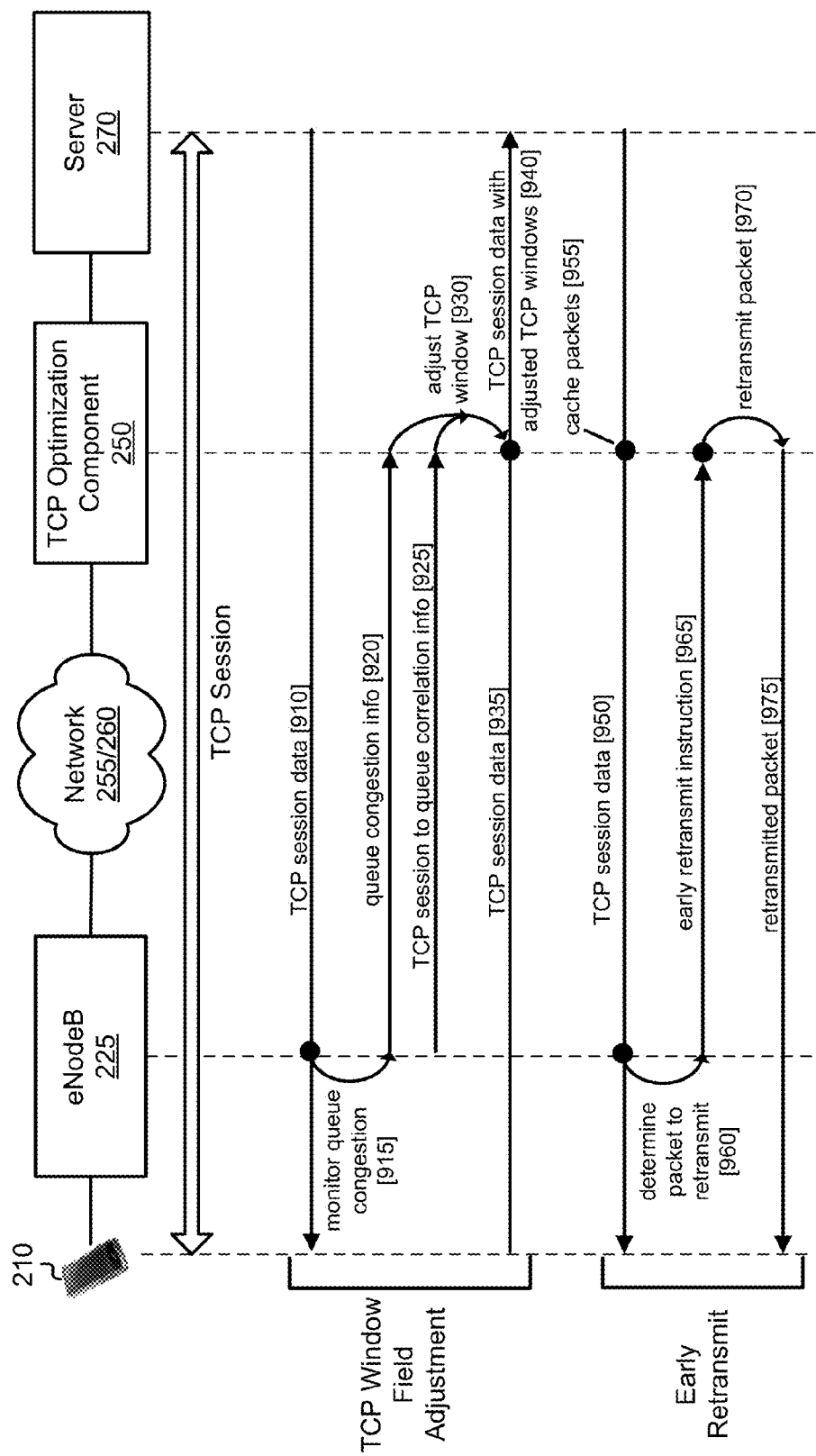
FIG. 9 is a diagram illustrating an example of an overview of additional techniques described herein.

FIG. 9 is a diagram illustrating an example of an overview of techniques described herein. As illustrated, a TCP session may be formed between UE 210 and server 270. The TCP session may traverse a number of network elements, including eNodeB 225, backhaul/internal metro network 255/260, TCP optimization component 250, and server 270. ENodeB 225 and TCP optimization component 250 may communicate with one another to optimize TCP sessions based on performing TCP window field adjustment and/or early retransmit. TCP window field adjustment may refer to dynamically modifying the TCP window field, by TCP optimization component 250, similar to the TCP window field modification technique described with respect to FIGS. 1-8. Early retransmit may generally refer to TCP optimization component 250 proactively retransmitting packets to eNodeB 225.

An example high-level signal flow, corresponding to the TCP window field adjustment technique, is illustrated in FIG. 9, as network signals/messages 910-940. As illustrated, server 270 may transmit, as part of a TCP session, TCP session data to UE 210 (at 910). The TCP session data may pass through eNodeB 225. ENodeB 225 may queue protocol data units (PDUs) (e.g., Media Access Control (MAC) frames or Radio Link Control (RLC) frames) as part of transmitting the data over the radio interface to UE 210. ENodeB 225 may monitor the queue occupancy or congestion (at 915) and may provide information relating to the queue congestion to TCP optimization component 250 (at 920). Additionally, eNodeB 225 may provide information, correlating TCP sessions to the queue occupancy information, to TCP optimization component 250 (at 925). In this manner, TCP optimization component 250 may be aware of the congestion state of queues at eNodeB 225 and may be aware of the particular TCP sessions that are affected by the congestion of the queues.

Based on this information, TCP optimization component 250 may adjust a TCP window field associated with the packets being transmitted from UE 210 to server 270 (at 930). For example, as a buffer at eNodeB 225 becomes congested, TCP optimization component 250 may determine to reduce the TCP window field in the packets associated with the corresponding TCP sessions. TCP optimization component 250 may thus modify the TCP window fields as the packets pass through TCP optimization component 250 (at 935 and 940). In this manner, server 270 may receive the adjusted TCP window values, and may accordingly act to adjust the error correction mechanisms of the TCP protocol to correspond to the current queue congestion state of eNodeB 225.

An example high-level signal flow, corresponding to the early retransmit technique, is illustrated in FIG. 9 as network signals/messages 950-975. In the TCP protocol, the end nodes in the TCP session (e.g., UE 210 and server 270) may detect lost packets and act to retransmit the lost packets. In early retransmit, as described herein, eNodeB 225 and TCP optimization component 250 may detect lost data that is likely to lead to lost packets, and in response, TCP optimization component 250 may preemptively retransmit the corresponding packet towards UE 210. From the point of view of UE 210, the packet may be received normally without requiring UE 210 to request retransmission of the packet by server 270.

As illustrated, server 270 may transmit, as part of a TCP session, TCP session data to UE 210 (at 950). TCP optimization component 250 may temporarily store (cache) the packets in the session (at 955). At some point, eNodeB 225 may determine that data, such as MAC PDUs, are lost during the transmission of the PDUs to UE 210, such as via losses on the radio link and/or dropping of the PDUs from the queues of eNodeB 225 (e.g., due to congestion). ENodeB 225 may determine the packet that corresponds to the lost PDU and may determine to request early transmit of the corresponding packet (at 960). ENodeB 225 may request an early retransmit of the corresponding packet by sending an early retransmit instruction to TCP optimization component 250 (at 965). In response to the early retransmit instruction, TCP optimization component 250 may retransmit the packet based on the previously cached copy of the packet (at 970). The retransmitted packet may be delivered to UE 210 (at 975) before UE 210, implementing the normal operation of the TCP protocol, requests retransmission of the packet from server 270.

In some implementations, when retransmitting a packet, TCP optimization component 250 may increase the QCI value of the retransmitted packet to give the packet a higher priority. In this manner, the delivery of the packet may be expedited, relative to the original QCI value of the packet, to UE 210. UE 210 may thus be more likely to receive the retransmitted packet before UE 210, implementing the normal operation of the TCP protocol, requests retransmission of the packet from server 270.

Figure 10:
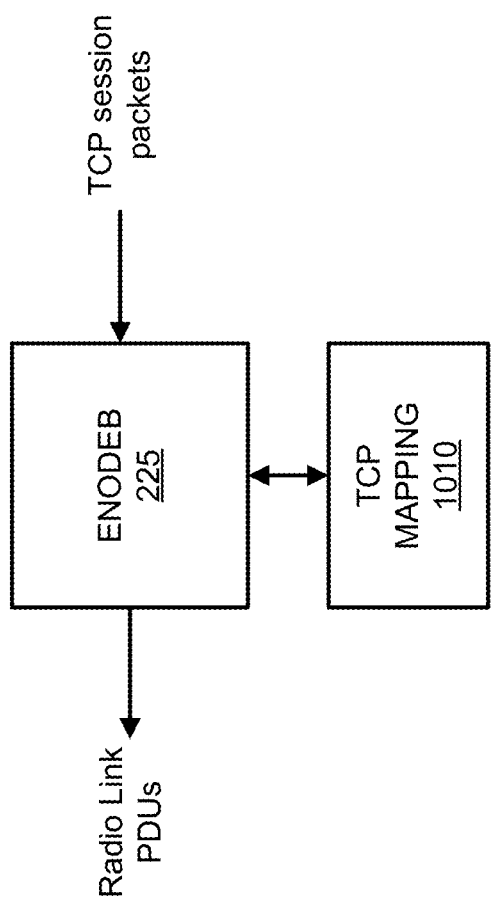
FIG. 10 is a diagram conceptually illustrating components associated with an eNodeB.

FIG. 10 is a diagram conceptually illustrating components associated with an eNodeB, in accordance with some implementations. In particular, as illustrated, eNodeB 225 may be associated with TCP mapping component 1010. In one implementation, TCP mapping component 1010 may be included as part of eNodeB 225. Alternatively or additionally, TCP mapping component 1010 may be implemented by a device external to eNodeB 225.

In the Open Systems Interconnection (OSI) model, various protocols may be implemented at various levels of the OSI protocol stack. For instance, eNodeB 225 may implement queues, such as queues 510, at the physical and/or data link of the OSI model, to queue MAC frames and/or RLC frames (also called PDUs herein). TCP communications, however, may be implemented at a higher layer of the OSI model, such as at the transport layer, and may operate on packets of data. As illustrated in FIG. 10, packets associated with TCP sessions may be received by eNodeB 225 and converted to PDUs for transmission over the radio link to UE 210.

TCP mapping component 1010 may be used by eNodeB 225 to correlate TCP sessions with PDUs. In this manner, for a particular PDU, eNodeB 225 may be able to determine the corresponding TCP session and/or the corresponding TCP packet.

In one implementation, TCP mapping component 1010 may include logic to map PDUs to corresponding TCP sessions and sequence numbers. In one implementation, TCP mapping component 1010 may be implemented as a table in computer memory. Alternatively or additionally, TCP mapping component 1010 may actively tag or label PDUs that are created within eNodeB 225. The tag/label information may then be used to track the delivery of the PDUs.

Figure 11:
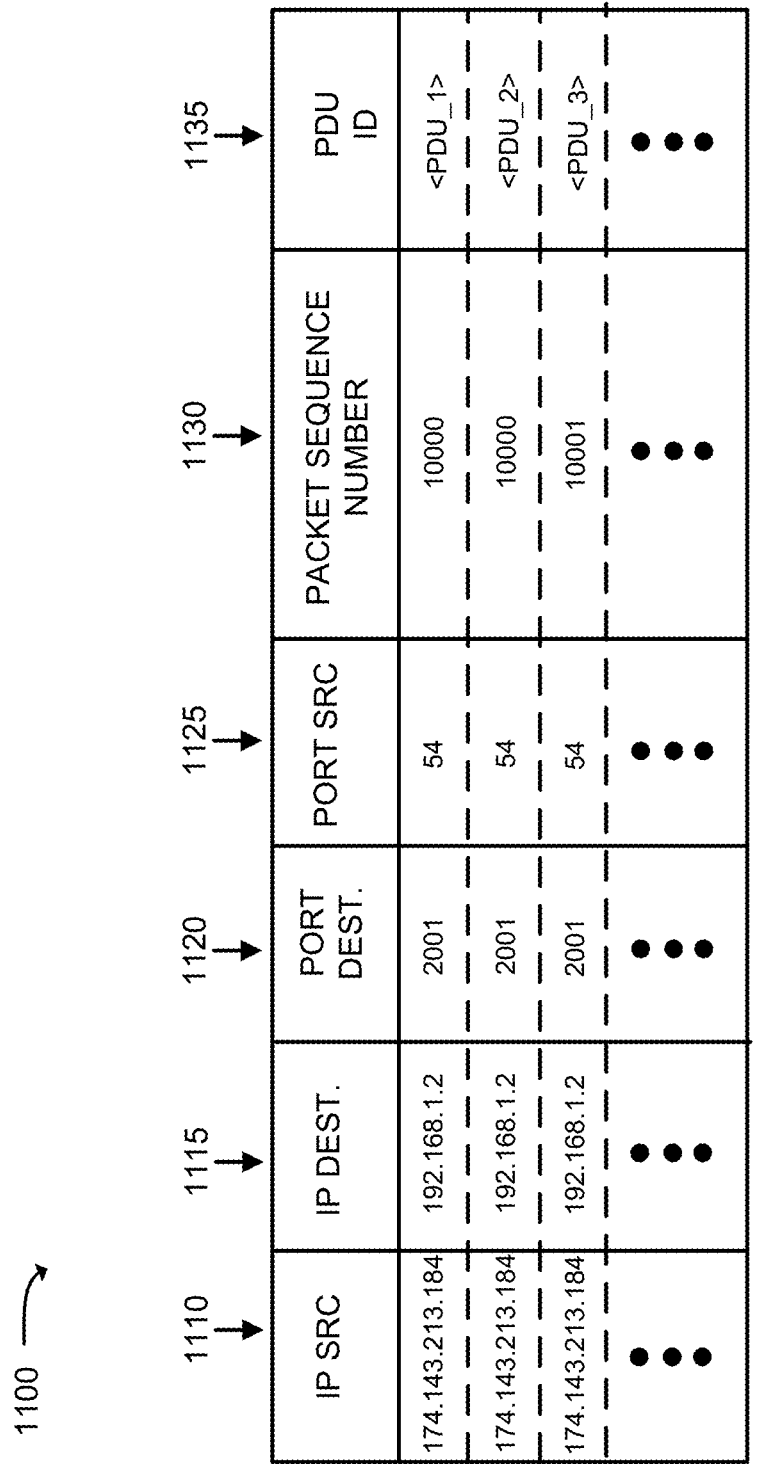
FIG. 11 is a diagram illustrating an example of a data structure that may be used to correlate protocol data units (PDUs) to corresponding TCP sessions.

FIG. 11 is a diagram illustrating an example of a data structure 1100 that may be used by TCP mapping component 1010 to correlate PDUs, such as MAC or RLC frames generated by eNodeB for transmission over a radio link, to corresponding TCP packets and/or sessions. Data structure 1100 may include IP source (SRC) field 1110, IP destination (DEST) field 1115, port destination field 1120, port source field 1125, packet sequence number field 1130, and PDU identifier (ID) field 1135. In other implementations, data structure 1100 may contain additional, fewer, or different fields than those illustrated FIG. 11.

IP source field 1110, IP destination field 1115, port destination field 1120, and port source field 1125 may collectively store the IP addressing information that identifies a particular TCP session. Packet sequence number field 1130 may include a packet sequence number from a packet associated with the TCP session identified via fields 1110-1125. The packet sequence numbers, for a particular TCP session, may each include unique numbers that the end-devices use to keep track of the transmitted packets.

PDU identifier field 1135 may include one or more values that are used to uniquely identify particular PDUs. Each record in data structure 1100 may be associated with a unique PDU, which may be identified in PDU identifier field 1135. PDU identifier field 1135 may include, for example, a link to the substantive data for a particular PDU, as stored by eNodeB 225, or other identification information.

Three example records are illustrated in data structure 1100. Each record may correspond to a PDU, labeled as <PDU_1>, <PDU_2>, and <PDU_3> respectfully. As illustrated, each of the three example PDUs is associated with the same TCP session, corresponding to the TCP session having the IP source address of 174.143.212.184, the IP destination address of 192.168.1.2, a destination port value of 2001, and a source port value of 54. The first two PDUs (<PDU_1> and <PDU_2>) may be PDUs that were derived from the packet having the sequence number 10000 and the third PDU (<PDU_3>) may be a PDU that was derived from the packet having the sequence number 10001.

Figure 12:
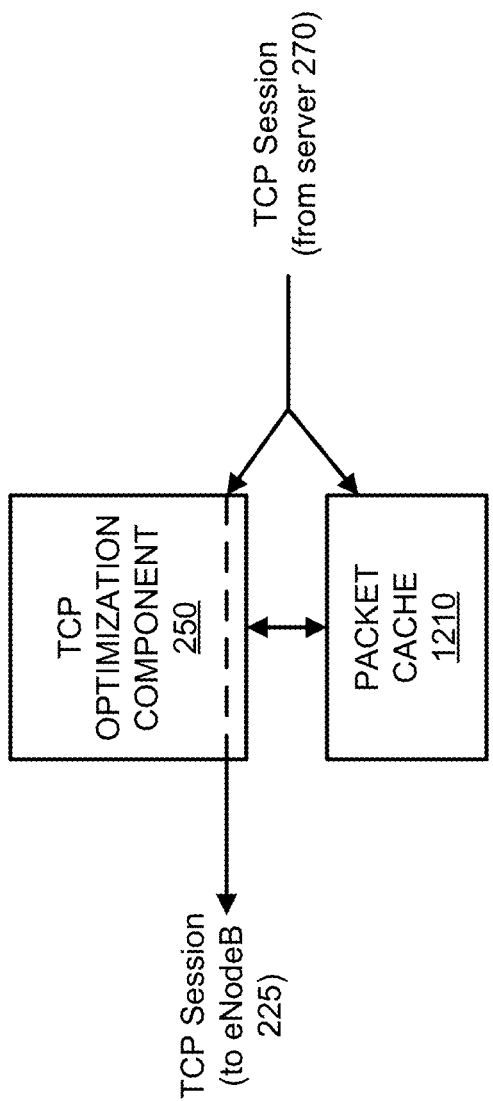
FIG. 12 is a diagram conceptually illustrating components associated with the TCP optimization component illustrated in FIG. 2.

FIG. 12 is a diagram conceptually illustrating components associated with TCP optimization component 250. In particular, as illustrated, TCP optimization component 250 may be associated with packet cache 1210. TCP optimization component 250 may store packets, such as packets that were transmitted from server 270 and that are being delivered to UE 210 via eNodeB 225. The packets may be temporarily stored in packet cache 1210. For example, incoming packets may be stored in packet cache 1210 for a time period long enough to ensure that the incoming packets have been delivered and will not need to be retransmitted. In some implementations, packets may be deleted from packet cache 1210 based on TCP optimization component 250 detecting acknowledgement of successful reception of a packet by UE 210 (e.g., by analyzing upstream traffic from UE 210). By caching incoming packets, TCP optimization component 250 may be able to implement early retransmit of packets associated with lost PDUs at eNodeB 225.

Figure 13:
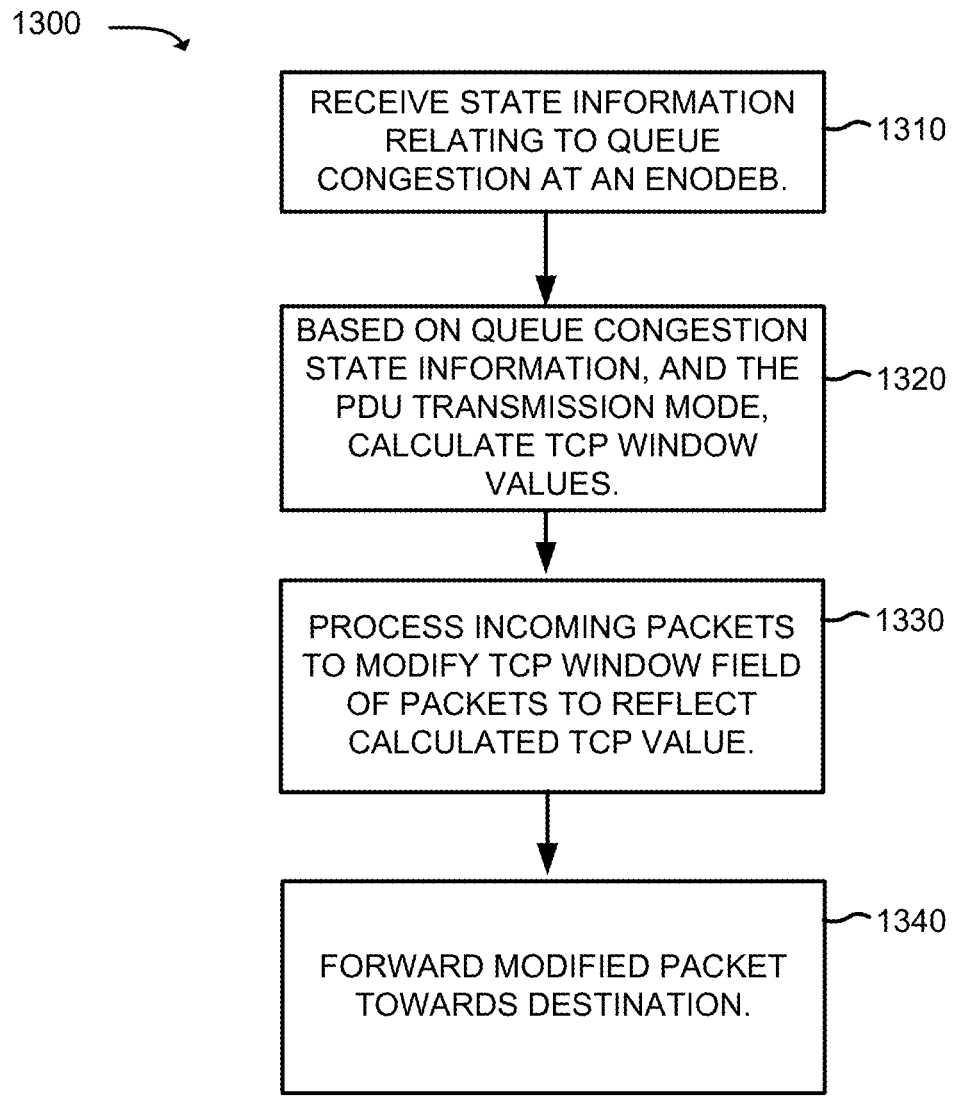
FIG. 13 is a flow chart illustrating an example process for optimizing traffic flow in TCP sessions using TCP window size adjustment.

FIG. 13 is a flow chart illustrating an example process 1300 for optimizing traffic flow in TCP sessions. In one implementation, process 1300 may be performed by TCP optimization component 250 and may correspond to a process for implementing TCP window field adjustment.

Process 1300 may include receiving state information relating to the congestion state of queues at one or more eNodeBs (block 1310). For example, eNodeB 225 may broadcast or otherwise transmit congestion state information to TCP optimization component 250. The congestion state information may, for example, describe a congestion state of each of a number of queues 510 that are maintained by eNodeB 225 as part of the transmission of packets, over a radio interface, to UEs 210. Alternatively or additionally, the congestion state information may include an indication of a level of congestion for various TCP sessions. As previously discussed, TCP mapping component 1010 may, via data structure 1100, correlate the TCP sessions in eNodeB 225 to the PDUs that correspond to the TCP sessions. ENodeB 225 may determine the queue(s) that correspond to a particular TCP session and provide corresponding congestion information, relating to the queue(s), to TCP optimization component 250.

When transmitting PDUs over the radio interface, in some implementations, eNodeB 225 may use different delivery modes to transmit the PDUs. For example, when using RLC to transmit PDUs over the radio interface, a number of different delivery modes are supported, including: transparent mode (TM), unacknowledged mode (UM), and acknowledged mode (AM). The different modes may be suitable for carrying different types of traffic and may include different delivery guarantees. In one implementation, the congestion state information may include an indication of the delivery mode or modes being used for the particular TCP sessions.

Process 1300 may further include calculating TCP window values based on the congestion state information relating to queue congestion and/or the delivery mode (block 1320). In one implementation, the calculated TCP window values may be values designed to optimize flow control, in a TCP session, in response to a current level of congestion in the corresponding queue. Because the level of congestion may directly relate to congestion in the RAN or to other factors that affect bandwidths through the radio interface, flow control in the TCP session may be controlled based on knowledge of the state of the radio interface for a particular TCP session. In general, the calculated TCP window value may be determined to adopt to changes in the queue congestion state to adjust the TCP window values dynamically as the queues fill and drain. Advantageously, some level of proactive control of congestion may be achieved before the queues are actually blocked.

In some implementations, the TCP window values may be scaled based on queue occupancy thresholds. For example, when buffer occupancies reach various occupancy threshold levels, x, such as 75%, 80%, . . . , 95%, 100%, the current TCP window values may be scaled linearly by a factor such as: 1−x. In this example, for an occupancy threshold of 95%, the current TCP window value may be multiplied by 0.05

(i.e., 1-0.95). It can be appreciated that other techniques could potentially be used to calculate the updated TCP window values.

In one implementation, the calculation of the TCP window values may be based on the transmission mode (e.g., AM, TM, or UM). A different technique could, in some implementations, be used to calculate the TCP window values for each of the transmission methods. For example, different threshold levels of congestion may be used, for the different transmission modes, to cause changes to the TCP window values.

In some implementations, the calculation of the TCP window values (block 1320) may be performed by software portion 320 of TCP congestion component 250. The calculated window values may be stored in a data structure, which may be used to quickly lookup the TCP window value corresponding to a particular TCP session (e.g., as identified by IP address and port information included in a packet).

Process 1300 may further include processing incoming packets to modify the TCP window field of the packets to reflect the calculated TCP window values (block 1330). For example, TCP optimization component 250 may extract the IP address information from each packet (e.g., the IP source address, the IP destination address, the source port value, and the destination port value) and use the IP address information to determine the TCP session associated with the packet and the corresponding calculated TCP window value. TCP optimization component 250 may then modify the TCP window value in a header of the packet before the packet is transmitted from TCP optimization component 250. In some implementations, block 740 may be performed by hardware portion 330, of TCP optimization component 250, to obtain wirespeed or near-wirespeed operation.

Process 1300 may further include forwarding the modified packets towards the destinations corresponding to the packets (block 1340). The forwarded packets may include the packets in which the TCP window value is modified.

Dynamically modifying TCP window values may be particularly useful to help with queue congestion control and buffer starvation. In addition to modifying TCP window values, TCP optimization component 250 may, in conjunction with eNodeB 225, implement early retransmit of packets. Early retransmit may act to complement the modification of TCP window values and can be particularly useful to compensate for losses or errors associated with the radio interface.

Figure 14:
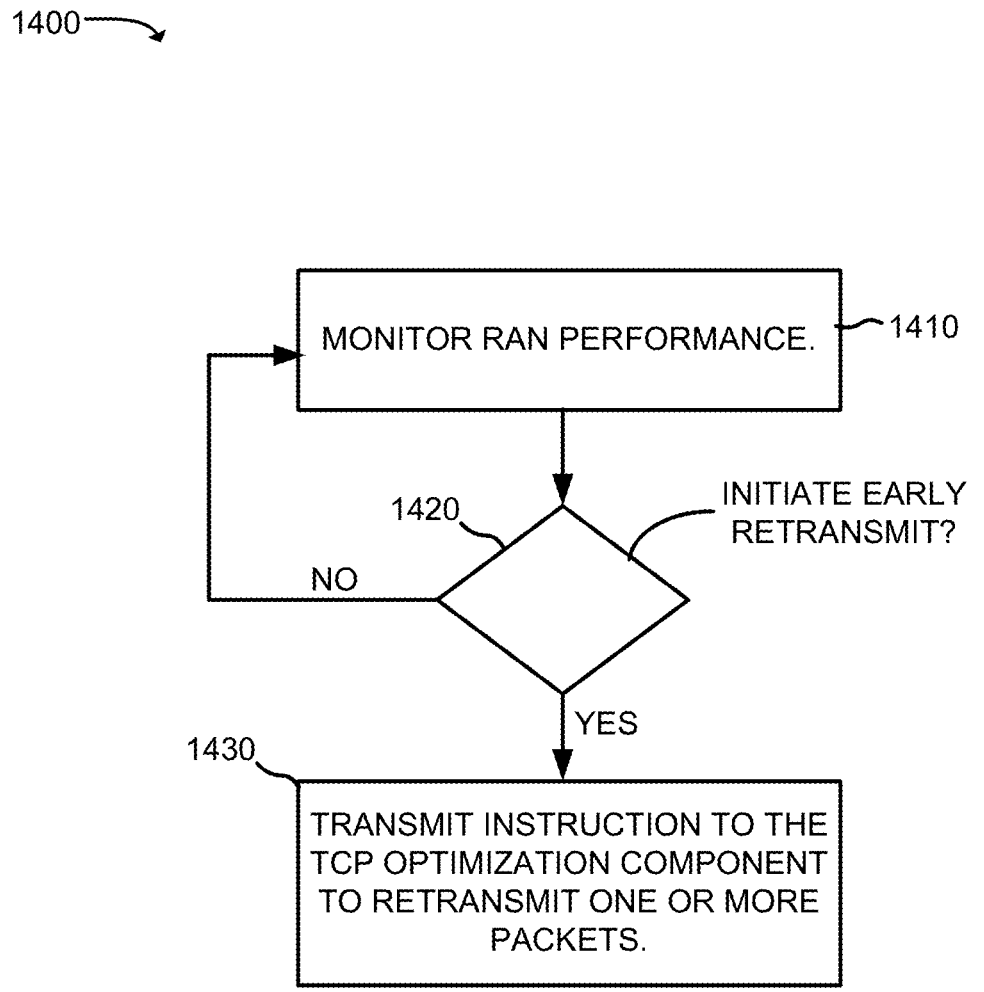
FIG. 14 is a flow chart illustrating an example process for optimizing traffic flow in TCP sessions using early retransmit.

FIG. 14 is a flow chart illustrating an example process 1400 for optimizing traffic flow in TCP sessions using early retransmit. In one implementation, process 1400 may be performed by eNode 225.

Process 1400 may include monitoring the performance of the RAN (block 1410). In one implementation, eNodeB 225 may monitor a number of performance parameters relating to transmissions over the radio interface. The performance parameters may include retransmission counts for various transmission modes. For example, in the case of AM, eNodeB 225 may monitor: counts of RLC Automated Repeat Request (ARQ) retransmissions, counts of MAC Hybrid Automated Repeat Request (HARQ) retransmissions, counts of RLC ARQ negative acknowledgments (NACKs), and counts of MAC HARQ NACKs. In the case of UM, eNodeB 225 may monitor: counts of MAC HARQ retransmissions and counts of MAC HARQ NACKs. In the case of AM, TM, and UM, eNodeB 225 may also monitor queue congestion levels and queue discards. In other implementations, other performance parameters, relating to RAN transmissions, may be monitored and used to determine whether to implement early retransmit.

Process 1400 may further include determining whether to initiate an early retransmit of a packet (block 1420). Whether to initiate an early retransmit may be based on values for one or more of the monitored RAN performance parameters. In one implementation, each of the monitored retransmission counts may be associated with a threshold that is used to determine when to initiate early retransmission. For example, when MAC HARQ or RLC ARQ retransmission counts for a PDU reach a particular threshold level or a predefined maximum limit, early retransmit may be initiated. The threshold levels for the retransmission counts may be assigned differently based on the different transmission modes (i.e., AM, TM, and UM). In some implementations, early retransmit may be initiated only when a number of different retransmission counts each reach respective threshold values or when the sum (or other combination) of a number of different performance parameters reach a certain threshold. Further, other RAN performance parameters, such as queue congestion levels and/or queue discards, may be used to determine whether to initiate early retransmit. For example, when a queue reaches a threshold level of congestion, early retransmit may be proactively initiated.

Process 1400 may further include, when an early retransmit is determined to be initiated (block 1420-YES), transmitting an instruction, such as to TCP optimization component 250, to retransmit one or more packets (block 1430). As previously mentioned, data structure 1100 may maintain a mapping that can be used to correlate PDUs being transmitted over the RAN, such as MAC or RLC frames, to the corresponding packets. Based on data structure 1100, eNodeB 225 may thus determine the packet(s) that are to be retransmitted in order to compensate for the PDUs that are lost.

TCP optimization component 250 may receive the early retransmit instruction, which may include an indication of one or more packets that are to be retransmitted. TCP optimization component 250 may retrieve the one or more packets, such as from packet cache 1210, and transmit the one or packets towards UE 210. In one implementation, in order to increase the likelihood of the retransmitted one or more packets being received before UE 210 requests a packet retransmission from server 270 (e.g., as part of the normal operation of the TCP protocol), the retransmitted packets may be transmitted using a higher QCI level (i.e., a class identifier value that indicates that the packet is of a higher priority than the original transmission of the packet). In this manner, the delivery of the retransmitted packets may be expedited to UE 210.

The above described early retransmit technique implemented a cross-layer technique to improve end-to-end TCP performance in the presence of losses, errors, and buffer discards associated with the radio interface. The early retransmit technique may be used separately from, or in conjunction with, the dynamic modification of TCP window values.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 7, 13, and 14, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
monitoring, by a base station, performance parameters relating to a radio access network (RAN);
determining, by the base station and based on the performance parameters, one or more protocol data units (PDUs) to retransmit;
determining, by the base station, one or more Transmission Control Protocol (TCP) sessions and packet sequence numbers corresponding to the one or more PDUs;
determining, by the base station and based on the performance parameters, to implement early retransmission of the PDUs;
implementing the early retransmission of the PDUs by:
prior to the base station detecting a failure of transmitted packets, and prior to receiving, from a first end device and intended for a second end device, a request-for the second end device to retransmit packets corresponding to the one or more TCP sessions and packet sequences,
transmitting, by the base station and to a network device, an indication to retransmit the packets corresponding to the one or more TCP sessions and packet sequence numbers; and
receiving, by the base station, from the network device, and in response to transmitting the indication, the packets corresponding to the indication, the packets having a higher Quality of Service Class Identifier (QCI) value than a QCI value with which the transmitted packets were originally transmitted.

2. The method of claim 1, wherein the PDUs include Media Access Control (MAC) frames or Radio Link Control (RLC) frames.

3. The method of claim 2, wherein the performance parameters include at least one of retransmission counts of Automated Repeat Request (ARC)) transmissions, MAC Hybrid Automated Repeat Request (HARQ) transmissions, Reply to Final Office Action of Jun. 16, 2017 U. S. patent application Ser. No. 14/216,519 RLC ARQ negative acknowledgments (NACKs), or counts of MAC HARQ NACKs.

4. The method of claim 3, wherein determining the one or more PDUs includes: determining the one or more PDUs based on the performance parameters meeting one or more threshold values.

5. The method of claim 2, wherein the performance parameters include congestion levels of queues in the base station.

6. The method of claim 1, wherein the base station includes an evolved Node B (eNodeB) in a Long Term Evolution (LTE) network.

7. The method of claim 1, further comprising: maintaining a data structure correlating the one or more TOP sessions and packet sequence numbers to the one or more PDUs, wherein the determining the TOP sessions and packet sequence numbers is based on the data structure.

8. A network device comprising:
a non-transitory memory device storing a plurality of processor-executable instructions; and
a processor configured to execute the processor-executable instructions, wherein executing the processor-executable instructions causes the processor to:
receive packets from a server device as part of a Transmission Control Protocol (TCP) session;
cache the received packets in a cache; transmit the received packets towards a destination device;
prior to a base station detecting a failure of the transmitted packets, and prior to receiving a request, initiated by the destination device and intended for the server device, to retransmit packets corresponding to the TOP session, receive, from a base station associated with a wireless network, an instruction to retransmit, to the destination device, one or more of the transmitted packets, the instruction being initiated by the base station; and
retransmit, in response to the instruction, the one or more of the received packets, towards the destination device, the one or more received packets having a higher Quality of Service Class Identifier (QCI) value than a QCI value with which the transmitted packet was originally transmitted.

9. The network device of claim 8, wherein the instruction to retransmit the one or more of the transmitted packets includes an identification of a TOP session and packet sequence number.

10. The network device of claim 8, wherein the processing circuitry is further to: detect, based on an analysis of packets received from the destination device, acknowledgements of successful delivery of cached packets; and delete the successfully delivered packets from the cache.

11. The network device of claim 8, wherein the processing circuitry is further to: receive state information relating to congestion at the base station; receive packets transmitted by the destination device; modify a Transmission Control Protocol (TOP) window field of the packets received from the destination device, the modification of the TOP window field being based on the state information; and forward the modified version of the packets towards the server device.

12. The network device of claim 8, wherein the state information includes information relating to a level of congestion at queues maintained by the base station.

13. The network device of claim 8, wherein the wireless network includes a Reply to Final Office Action of Jun. 16, 2017 U.S. patent application Ser. No. 14/216,519 Long Term Evolution (LTE) network, and wherein the base station includes an Evolved Node B (eNodeB).

14. A system comprising:
a base station including processing circuitry to: monitor performance parameters relating to a radio access network (RAN) used to wirelessly connect to user equipment (UE),
determine, based on the performance parameters, one or more protocol data units (PDUs) to retransmit, determine a packet corresponding to the one or more PDUs,
determine, by the base station and based on the performance parameters, to implement early retransmission of the one or more PDUs, and
implement the early retransmission of the one or more PDUs by:
prior to detecting a failure of the base station to transmit the packet, and prior to receiving, from the UE and intended for a server device, a request for the server device to retransmit the packet corresponding to the one or more PDUs,
transmit an indication to retransmit the packet; and
a network device including processing circuitry to:
receive, from the base station; the indication to retransmit the packet, read the packet from a cache maintained by the network device, and
transmit, in response to the indication, the packet towards the UE via the base station, the packet having a higher Quality of Service Class Identifier (QCI) value than a QCI value with which the transmitted packet was originally transmitted.

15. The system of claim 14, wherein the PDUs include at least one of Media Access Control (MAC) frames, or Radio Link Control (RLC) frames.

16. The system of claim 15, wherein the performance parameters Include at least one of retransmission counts of Automated Repeat Request (ARQ) transmissions, MAC Hybrid Automated Repeat Request (HARQ) transmissions, Reply to Final Office Action of Jun. 16, 2017 U.S. patent application Ser. No. 14/216,519 RLC ARQ negative acknowledgments (NACKs), or counts of MAC HARQ NACKs.

17. The system of claim 14, wherein the processing circuitry of the network device, when transmitting the packet towards the UE, is further to: transmit the packet using a higher Quality of Service (QoS) priority value than a QoS priority value with which the packet was originally transmitted.

18. The system of claim 14, wherein the indication to retransmit the packet includes an identification of a Transmission Control Protocol (TCP) session and packet sequence number.

19. The system of claim 14, wherein the processing circuitry of the network device, is further to: receive packets transmitted by the UE; modify a Transmission Control Protocol (TCP) window field of the packets received from the UE; and forward the modified versions of the packets towards a server device.

20. The method of claim 1, wherein: the performance parameters include at least two of: retransmission counts of Automated Repeat Request (ARQ) transmissions, MAC Hybrid Automated Repeat Request (HARQ) transmissions, RLC ARQ negative acknowledgments (NACKs), or counts of MAC HARQ NACKs; and determining to implement retransmission is based on each performance parameter meeting a threshold value associated with the performance parameter.

* * * * *